US010787620B2

(12) United States Patent
Qiao et al.

(10) Patent No.: US 10,787,620 B2
(45) Date of Patent: Sep. 29, 2020

(54) METHOD OF BIOMASS GRADING PYROLYSIS GASIFICATION IN A CIRCULATING FLUIDIZED BED

(71) Applicant: China University of Petroleum (East China), Qingdao (CN)

(72) Inventors: Yingyun Qiao, Qingdao (CN); Yuanyu Tian, Qingdao (CN); Youqing Wu, Shanghai (CN); Huawei Zhang, Qingdao (CN); Peijie Zong, Qingdao (CN); Jie Li, Qingdao (CN); Xue Ming, Qingdao (CN); Yuan Jiang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/293,314

(22) Filed: Mar. 5, 2019

(65) Prior Publication Data

US 2020/0224110 A1  Jul. 16, 2020

(30) Foreign Application Priority Data

Jan. 16, 2019  (CN) .......................... 2019 1 0038001

(51) Int. Cl.
*C10J 3/54* (2006.01)
*C10J 3/56* (2006.01)
(Continued)

(52) U.S. Cl.
CPC . *C10J 3/54* (2013.01); *C10J 3/56* (2013.01); *C10J 3/66* (2013.01); *C10J 3/84* (2013.01);
(Continued)

(58) Field of Classification Search
CPC ......... C10J 3/54; C10J 3/66; C10J 3/84; C10J 2300/0916; C10J 2300/092;
(Continued)

(56) References Cited

U.S. PATENT DOCUMENTS

2018/0312769 A1* 11/2018 Jack ........................ B02C 23/10

FOREIGN PATENT DOCUMENTS

| CN | 102942965 A | 2/2013 |
|---|---|---|
| CN | 103102990 A | 5/2013 |

* cited by examiner

*Primary Examiner* — Renee Robinson
(74) *Attorney, Agent, or Firm* — Volpe and Koenig, P.C.

(57) ABSTRACT

The invention provides a method of biomass grading pyrolysis gasification in a circulating fluidized bed comprising: feeding biomass into the lower-middle part of a carrying fluidized bed, mixing with high temperature synthesis gas and heat carrier from a turbulent fluidized bed, heating the biomass to carry out a pyrolysis reaction, and carrying the pyrolysis product upward; subjecting the cracked oil and gas to a gaseous phase catalytic cracking in an upper-middle part of the carrying fluidized bed, cracking the tar into methane, ethane and the like; subjecting the heat carrier, semi-coke and fuel gas after the reaction to the multi-stage of gas-solid separation, a large particle carrier and semi-coke following a first-level separation are used as the fuel gas cracking catalyst and the filter material for filtering and removing dust, and enter into a moving bed filter to separate out an ultra-fine ash and subsequently return to the turbulent fluidized bed so as to perform gasification reaction, the ultrafine ash is delivered to the outside as a silicon-potash fertilizer product; the medium and small particle carrier and semi-coke separated from a second-level separation are directly recycled to the turbulent fluidized bed, the fine particles separated from a third-level separation is discharged to the outside as a silicon-potash fertilizer product, (Continued)

the moving bed filter further catalytically cracks a small amount of tar in the fuel gas into methane and ethane and removes the ultra-fine ash simultaneously, the purified fuel gas is delivered to the outside as a product.

6 Claims, 1 Drawing Sheet

(51) Int. Cl.
*C10J 3/84* (2006.01)
*C10J 3/66* (2006.01)

(52) U.S. Cl.
CPC .... *C10J 2200/36* (2013.01); *C10J 2300/0916* (2013.01); *C10J 2300/0923* (2013.01); *C10J 2300/0986* (2013.01); *C10J 2300/0993* (2013.01); *C10J 2300/1606* (2013.01); *C10J 2300/1662* (2013.01)

(58) Field of Classification Search
CPC ........ C10J 2300/0923; C10J 2300/0986; C10J 2300/1606; C10J 2300/1662
See application file for complete search history.

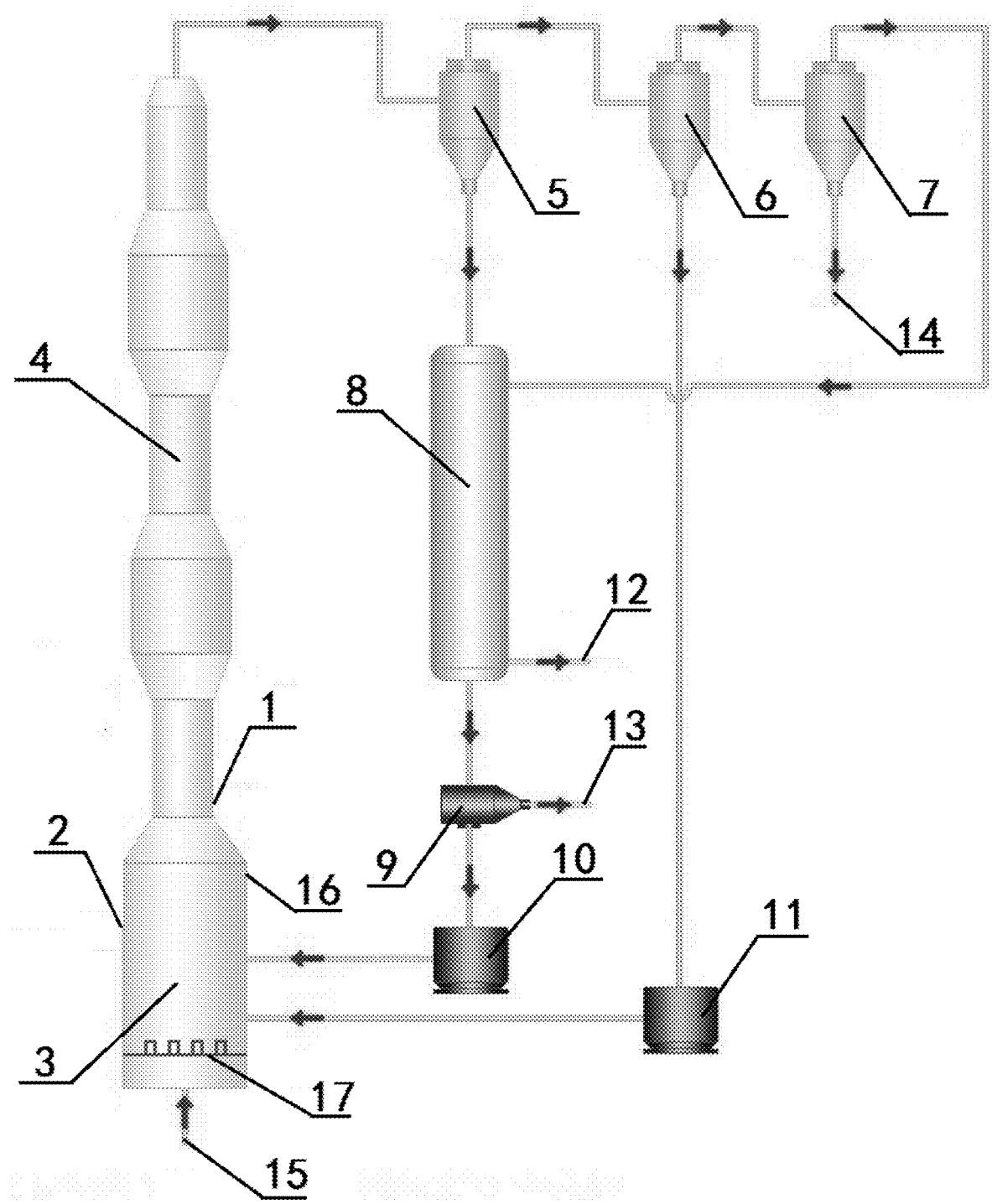

METHOD OF BIOMASS GRADING PYROLYSIS GASIFICATION IN A CIRCULATING FLUIDIZED BED

This application claims priority to Chinese Application No. 201910038001.8, filed on Jan. 15, 2019, entitled "Integrated process of biomass circulating fluidized bed grading pyrolysis gasification and high temperature tar removal dust removal", which is specifically and entirely incorporated by reference.

FIELD OF THE INVENTION

The present invention relates to the technical field of biomass gasification, and provides a method of biomass grading pyrolysis gasification in a circulating fluidized bed.

BACKGROUND OF THE INVENTION

The biomass in China is not only endowed with a vast amount of resource, but also a low-sulfur and carbon-neutral renewable clean energy, it plays a vital role in world energy security and carbon emission reduction.

As one of the main modes of efficiently and cleanly utilizing biomass energy in large scale, the gasification technology converts the biomass with low energy density from a solid state into the high grade combustible gases with lower molecular weight, such as CO, $H_2$ and $CH_4$, the combustible gases have many advantages as compared with the direct combustion of the biomass, such as stable combustion, high thermal efficiency, low pollution, especially low index of PM2.5 (particle matter having a particle size not more than 2.5 micrometer), the combustible gases can be widely used in various fields of industrial and agricultural production, for example, the existing centralized gas supply, heating and power generation, industrial boilers and furnaces, thereby achieving an in-depth utilization of low-grade biomass energy and reducing consumption of the fossil fuel, the gasification technology has great significance for raising rural living standards, improving the ecological environment, and safeguarding the national energy security.

The biomass gasification technology may be divided into fixed bed gasification technology, fluidized bed gasification technology and entrained flow bed gasification technology according to the type of gasification furnaces. The fixed bed gasification technology has a simple device structure, low operating cost, and high biomass conversion rate of over 98%, but it will produce a lot of refractory tar and brings about the secondary pollution of phenol-containing wastewater, it is suitable for small-scale gasification; the fluidized bed gasification technology can be used for large and medium-scale gasification, it is suitable for variable operation load, and the tar content is low, but the equipment structure is relatively complex, the operating costs are high, and the calorific value of gases is low; the entrained flow bed has high operating temperature, it does not generate tar, the follow-up treatment of gases has low difficulty, but the caloric value of gases is low, and the equipment investment is enormous. The biomass gasification products are most suitable for use as fuel gas because of its scale effect. It is urgent to develop biomass gasification technologies and equipment which have high conversion rates and calorific values, do not generate tar, and can effectively utilize silicon and potassium resources in the biomass.

CN102942965A discloses a biomass special-shaped circulating fluidized bed gasification process, the process comprises the following steps: feeding biomass having an average particle diameter less than 5 mm and a little heat carriers into a carrying reactor at lower-middle parts of a special-shaped circulating fluidized bed, mixing with gasified gas and circulating ash, upwards lifting, carrying out hydrogen-serviced pyrolysis, carrying out the two-stage gas-solid separation, returning high temperature coarse semi-coke and the circulating ash generated by first-level gas-solid separation to a turbulent fluidized bed on the bottom of a special-shaped circulating fluidized bed, reacting with oxidant and water vapor at the temperature of 800-1,100° C. to generate gasified coal gas, and making the gasified coal gas upwards flow together with the circulating ash to form material circulation; and delivering high temperature fine ash generated by second-level gas-solid separation as silicon-potash fertilizer towards outside, sending the gas to the outside as a product gas.

CN103102990A discloses a biomass abnormal circulating fluidizing bed gasifier, which consists of an abnormal circulating fluidized bed, a gas distributor, an ash discharge tube, a gas inlet tube, a feed inlet, a first-level gas-solid separator, a cinder circulating return tube, a return feeder, a second-level gas-solid separator, a silicon-potash fertilizer outlet and a fuel gas outlet. It is characterized in that the abnormal circulating fluidized bed consists of a turbulent fluidized bed and an entrained bed reactor. The gas distributor and the ash discharge tube are arranged at the bottom of the turbulent fluidized bed. A biomass feed inlet is arranged in a position which is 100-2,000 mm far from the bottom of the entrained bed reactor, and the first-level and second-level gas-liquid separators are arranged at the top. Coarse particle ash of the first-level gas-liquid separator enters into the circulating return tube and is connected with the turbulent fluidized bed at the bottom of the abnormal circulating fluidized bed through the returner. High temperature refine ash separated from the second-level gas-liquid separator is discharged outwards as the silicon-potash fertilizer from the silicon-potash fertilizer outlet, and gas is fed outwards as a product gas from the fuel gas outlet.

Both of the above-mentioned prior arts relate to a process of initially performing hydrogen pyrolysis of the biomass, then recycling the coarse particles to the turbulent fluidized bed for gasifying the semi-coke, discharging the fine particles to the outside as silicon-potash fertilizer, such a process not only solves the difficult problems such as the gasified biomass has low calorific value, the tar cannot be easily treated, and the scale is small, but also reasonably utilizes the silicon and potassium resources in the biomass to produce the fuel gas with a high content of methane. However, under the working conditions of varied raw material properties and operating conditions, it is still difficult to completely eliminate the tar and fine ash, and can hardly meet the requirements of subsequent power generation and heat supply. In the conventional method for eliminating tar and dust which are available at now, the cyclone separation and dust extraction can only remove dust having a particle size above 5 μm, the elimination of ultra-fine particles and tar are difficult; water scrubbing may remove the tar and dust simultaneously, but it will cause the secondary pollution of phenol-containing wastewater, an waste of the energy and resources; the filler filtration process can remove tar and dust at the same time, but it needs an additional filter material, the filter material is prone to block, a removal of the tar covering a surface of the filtering material is difficult, resulting in an increased operating cost and investment; thermal cracking needs the consumption of a portion of gas or semi-coke to produce the high temperature zones so as to accelerate decomposition of tar, the catalysts for catalytic cracking are prone to deactivate due to the carbon deposit, and the cost is high.

Therefore, it is necessary to develop a process with low energy consumption and low cost, which can eliminate tar and dust simultaneously, and integrate the gasification, removal of tar, and dust extraction.

SUMMARY OF THE INVENTION

A purpose of the present invention is to overcome the disadvantages of the existing biomass gasification technology such as the tar and dust cannot be eliminated simultaneously, the produced fuel gas product is unclean, thereby provide a method of biomass grading pyrolysis gasification in a circulating fluidized bed. The method can integrate the removal of tar under high temperature and dust cleansing in the process of gasifying biomass to prepare the fuel gas, it has the advantages such as the calorific value of fuel gas is high, the additional filter material and heating are not required, the phenol-containing wastewater is not generated, the system has a high thermal efficiency, the energy consumption is low, and the treatment scale is large.

For the sake of fulfilling the invention purpose, the present invention provides a method of biomass grading pyrolysis gasification in a circulating fluidized bed, as shown in FIG. 1, the method comprises:

1) feeding biomass particles having an average particle diameter less than 5 mm into the lower-middle part of a carrying fluidized bed in a circulating fluidized bed, and adding a heat carrier to be replenished having an average particle diameter less than 5 mm to a lower part of a turbulent fluidized bed in the circulating fluidized bed;

mixing, in the carrying fluidized bed, the high temperature synthesis gas and a heat carrier having a temperature of 750-950° C. from the turbulent fluidized bed with the biomass particles, and heating the biomass particles to carry out a high temperature hydro-rapid pyrolysis reaction, and carrying the pyrolysis product comprising the cracked oil and gas, heat carrier and semi-coke upward;

2) subjecting the cracked oil and gas to a first catalytic cracking in the upper part of the carrying fluidized bed, and pyrolyzing the tar in the cracked oil and gas to generate a high temperature fuel gas containing methane and ethane, wherein the first catalytic cracking is performed in the gaseous phase and in the presence of hydrogen, heat carrier and semi-coke, the first catalytic cracking temperature is 700-900° C.;

3) subjecting the catalytic cracking product obtained in step 2) to the multi-stage gas-solid separation:

performing a first-level purification of the catalytic cracking product with a first-level gas-solid separator to separate out a first-level crude fuel gas, a large particle carrier and semi-coke;

introducing the first-level crude fuel gas into a second-level gas-solid separator for carrying out a second-level purification, in order to separate out a second-level crude fuel gas, a medium and small particle carrier and semi-coke;

introducing the second-level crude fuel gas into a third-level gas-solid separator for performing a third-level purification, in order to separate out a third-level crude fuel gas and a fine particle material;

wherein the third-level crude fuel gas, the large particle carrier and the semi-coke enter into a moving bed high temperature filter, and the tar in the third-level crude fuel gas contacts with the large particle carrier and the semi-coke at a temperature of 700-850° C. to carry out a second catalytic cracking so as to produce a product containing methane and ethane; and the large particle carrier and the semi-coke are applied as the filter material to filter the third-level crude fuel gas to obtain a purified fuel gas product following a removal of the ultra-fine ash in the third-level crude fuel gas, then the filtered filter material is further subjected to the separation of ultra-fine ash, the separated ultrafine ash is discharged to the outside as a silicon-potash fertilizer product, and the residue following a removal of the ultra-fine ash passes through a returner and is returned to the turbulent fluidized bed for performing the combustion and gasification reaction;

the medium and small particle carrier and the semi-coke are directly recycled to the lower part of the turbulent fluidized bed for performing the combustion and gasification reaction.

Preferably, the heat carrier is one or more of fly ash, dolomite, olivine, limestone, zeolite, alkaline earth metal catalyst, iron-based catalyst, and inexpensive catalyst.

Preferably, the weight ratio of the biomass particles to the heat carrier is 1:2-8 in step 1).

Preferably, the temperature of the high temperature synthesis gas and heat carrier is lowered by 25-100° C. after the high temperature hydro-rapid pyrolysis reaction in step 1).

Preferably, the pyrolysis product has an ascending gas velocity of 3.5-18 m/s in the carrying fluidized bed in step 1).

Preferably, the separation cut particle size of the first-level purification is more than 0.05 mm.

Preferably, the separation cut particle size of the second-level purification is more than 0.02 mm.

Preferably, the separation cut particle size of the three-level purification is more than 0.005 mm.

Preferably, the separation efficiency of the multi-stage gas-solid separation is more than 99.5%.

Preferably, in the moving bed high temperature filter, during the filter, the removal rate of filtered dust is more than 90%, and the purified gas product contains tar being less than 1.5 mg/Nm$^3$, and dust being less than 5 mg/Nm$^3$.

Preferably, the process of the combustion and gasification reaction comprises:

the residue after a removal of the ultra-fine ash, the medium and small particle carrier and the semi-coke are reacted in the turbulent fluidized bed with an oxygen-containing gas and water vapor, so as to produce the high temperature synthesis gas and the heat carrier in the step 1); a temperature of the combustion and gasification reaction ranges from 750-950° C.

By means of the above-mentioned technical solution, the present invention performs fractionation and separation of the high temperature gas, the pyrolysis semi-coke and the heat carrier discharged from the top of the circulating fluidized bed, and the variety of products separated from the different stages may be utilized respectively such that the purified fuel gas is basically free of tar and ash; the separated large particle carrier and semi-coke can be used as a filter material layer of a high temperature moving bed (acting as a catalyst bed layer) in the moving bed high temperature filter so as to catalytically crack the tar in the high temperature fuel gas, and further act as a filter material for filtering and removing the dust simultaneously, and it is then returned to the turbulent fluidized bed at the lower part of the circulating fluidized bed for participating in the combustion and gasification reaction; the separated medium and small particle carrier and semi-coke may be directly recycled to the turbulent fluidized bed to participate in the combustion and gasification reaction, thereby playing a role of gasification and stabilizing combustion; the separated fine particles can be discharged to outside as the silicon-potash fertilizer product; the separated and purified fuel gas is basically free of tar and dust, and can be directly used in the Biomass-based Integrated Gasification Combined-Cycle (BIGCC) power generation or be applied as the fuel of industrial boilers and furnaces, thereby significantly improving efficiency of the power generation or combustion; in addition, the process may avoid the secondary pollution caused by the phenol-containing wastewater, and does not require the additional filter material and energy.

The features of the present invention will be described in detail with reference to the embodiment examples.

BRIEF DESCRIPTION OF THE DRAWINGS

FIG. 1 is a schematic diagram of a work flow of the method of biomass grading pyrolysis gasification in a circulating fluidized bed.

| Description of the reference signs | | |
|---|---|---|
| 1. biomass particle inlet | 2. heat carrier inlet | 3. turbulent fluidized bed |
| 4. carrying fluidized bed | 5. first-level gas-solid separator | 6. second-level gas-solid separator |
| 7. third-level gas-solid separator | 8. moving bed high temperature filter | 9. ultra-fine ash separator |
| 10. first-level return feeder | 11. second-level return feeder | 12. purified fuel gas outlet |
| 13. ultra-fine silicon-potash fertilizer outlet | 14. silicon-potash fertilizer outlet | 15. oxygen-containing gas and water vapor inlet |
| 16. circulating fluidized bed | 17. air distribution board | |

DETAILED DESCRIPTION OF THE EMBODIMENTS

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The invention provides a method of biomass grading pyrolysis gasification in a circulating fluidized bed, as shown in FIG. 1, the method comprises:

1) feeding biomass particles having an average particle diameter less than 5 mm into the lower-middle part of a carrying fluidized bed 4 in a circulating fluidized bed 16 via a biomass particle inlet 1, and adding a heat carrier to be replenished having an average particle diameter less than 5 mm from a heat carrier inlet 2 to a lower part of a turbulent fluidized bed 3 in the circulating fluidized bed;

mixing, in the carrying fluidized bed 4, the high temperature synthesis gas and a heat carrier having a temperature of 750-950° C. from the turbulent fluidized bed 3 with the biomass particles, and heating the biomass particles to carry out a high temperature hydro-rapid pyrolysis reaction, and carrying the pyrolysis product comprising the cracked oil and gas, heat carrier and semi-coke upward;

2) subjecting the cracked oil and gas to a first catalytic cracking in the upper part of the carrying fluidized bed 4, and pyrolyzing the tar in the cracked oil and gas to generate a high temperature fuel gas containing methane and ethane, wherein the first catalytic cracking is performed in the gaseous phase and in the presence of hydrogen, heat carrier and semi-coke, the first catalytic cracking temperature is 700-900° C.;

3) subjecting the catalytic cracking product obtained in step 2) to the multi-stage gas-solid separation:

performing a first-level purification of the catalytic cracking products with a first-level gas-solid separator 5 to separate out a first-level crude fuel gas, a large particle carrier and semi-coke;

introducing the first-level crude fuel gas into a second-level gas-solid separator 6 for carrying out a second-level purification, in order to separate out a second-level crude fuel gas, a medium and small particle carrier and semi-coke;

introducing the second-level crude fuel gas into a third-level gas-solid separator 7 for performing a third-level purification, in order to separate out a third-level crude fuel gas and a fine particle materials; the separated fine particles are discharged from a silicon-potash fertilizer outlet 14 to the outside;

wherein the third-level crude fuel gas, the large particle carrier and the semi-coke enter into a moving bed high temperature filter 8, and the tar in the third-level crude fuel gas contacts with the large particle carrier and the semi-coke at a temperature of 700-850° C. to carry out a second catalytic cracking so as to produce a product containing methane and ethane; and the large particle carrier and the semi-coke are applied as the filter material to filter the third-level crude fuel gas to obtain a purified fuel gas product following a removal of the ultra-fine ash in the third-level crude fuel gas, the purified fuel gas product is delivered to the outside from a purified fuel gas outlet 12, then the filtered filter material enters into an ultra-fine ash separator 9 and subjects to the separation of ultra-fine ash, the separated ultrafine ash is used as a silicon-potash fertilizer product and is discharged from an ultra-fine silicon-potash fertilizer outlet 13 to the outside, and the residue following a removal of the ultra-fine ash passes through a first-level return feeder 10 and is returned to the turbulent fluidized bed 3 for performing the combustion gasification reaction;

the medium and small particle carrier and the semi-coke pass through a second-level return feeder 11 and are directly recycled to the lower part of the turbulent fluidized bed 3 for the performing combustion and gasification reaction.

In the present invention, the pyrolysis product is carried upward in a carrying fluidized bed to the upper part of the carrying fluidized bed, and the heat carrier and semi-coke in the pyrolysis product may function as a catalyst, such that the cracked oil and gas in the pyrolysis product are subjected to the first catalytic cracking, and the obtained catalytic cracking reaction product may be a gas-solid mixture comprising the heat carrier and semi-coke after the first catalytic cracking, and the produced high temperature fuel gas.

In the present invention, the weight ratio of the biomass particles to the heat carrier added into the circulating fluidized bed is 1:2-8 in step 1).

In the present invention, preferably, the pyrolysis product has an ascending gas velocity of 3.5-18 m/s in the carrying fluidized bed in step 1).

In the high temperature hydrog-rapid pyrolysis reaction process of the invention, the biomass particles are heated by a high temperature synthesis gas and a heat carrier at a temperature 750-950° C. from the turbulent fluidized bed 3, and then the high temperature synthesis gas and heat carrier is cooled, wherein in the step 1), the temperature of the high temperature synthesis gas and the heat carrier is lowered by 25-100° C. after the high temperature hydro-rapid pyrolysis reaction.

The multi-stage gas-solid separation in step 3) of the present invention separates the high temperature hot fuel gas contained in the catalytic cracking product from the solids having different particle sizes. Separating solids are stepwise defined to a specific particle size. The separation cut size refers to the particle size that defines the separated solid. Specifically, the separation cut particle size of the first-level purification is more than 0.05 mm, that is, the separated solids have a particle size more than 0.05 mm. The particles with a particle size no more than 0.05 mm are separated by the second-level purification and the third-level purification. The separation cut particle size of the second-level purification is more than 0.02 mm, that is, on the basis of the first-level purification, the first-level crude fuel gas obtained from the first-level purification is separated to obtain particles having a particle size no less than 0.02 mm. The separation cut particle size of the three-level purification is more than 0.005 mm, that is, on the basis of the second-level purification, the second-level crude fuel gas obtained from the second-level purification is separated to obtain particles having a particle size no less than 0.005 mm. Finally, a total of 99.5% of solid particles can be separated from the catalytic cracking product (the separation efficiency of the multi-stage gas-solid separation is more than 99.5%), thereby perform an efficient gas-solid separation.

In the present invention, as shown in the FIGURE, an oxygen-containing gas and water vapor are supplied from an oxygen-containing gas and water vapor inlet 15 at the bottom of the turbulent fluidized bed 3 to the turbulent fluidized bed 3, and pass through the air distribution plate 17 and flow into a turbulent fluidized bed 3 for performing the combustion gasification reaction. The residue after a removal of the ultra-fine ash, the medium and small particle carrier and the semi-coke separated from the second-level purification are reacted (in the turbulent fluidized bed 3) with an oxygen-containing gas and water vapor, so as to produce the high temperature synthesis gas and the heat carrier in the step 1); a temperature of the combustion and gasification reaction ranges from 750-950° C.

In the present invention, the biomass particles may be at least one of pine powder, poplar powder, corn stover, and cotton straw. The average particle diameter of the particles is less than 5 mm.

In the present invention, the heat carrier may be one or more of fly ash, dolomite, olivine, limestone, zeolite, alkaline earth metal catalyst, iron-based catalyst, and inexpensive catalyst. The average particle diameter of the particles is less than 5 mm.

Based on the method provided by the invention, the fuel gas produced (the content of tar is less than 1.5 mg/Nm$^3$, and the content of dust is less than 5 mg/Nm$^3$ in the fuel gas) by gasifying biomass has high calorific value, it is basically free of tar and ash, and can avoid the secondary pollution caused by the phenol-containing wastewater, the fuel gas can be directly used in the Biomass-based Integrated Gasification Combined-Cycle (BIGCC) power generation or be applied as the fuel of industrial boilers and furnaces, thereby significantly improving efficiency of the power generation or combustion; in addition, the discharging of the silicon-potash fertilizer effectively solves the problem of coking and deactivation of the fluidized bed in the gasification process due to the potassium ion, and the process reasonably utilizes the silicon and potassium resources in the biomass, the technological process is simple, and the heat energy is reasonably utilized, thereby produces many benefits from a single process.

The following examples are used to describe the present invention in detail.

Example 1

1) feeding pine powder having an average particle diameter less than 5 mm into the lower-middle part of a carrying fluidized bed 4 in a circulating fluidized bed 16 via a biomass particle inlet 1, and adding fly ash to be replenished having an average particle diameter less than 5 mm from a heat carrier inlet 2 to a lower part of a turbulent fluidized bed 3 in the circulating fluidized bed 16;

mixing, in the carrying fluidized bed 4, the high temperature synthesis gas and the fly ash having a temperature of 800° C. from the turbulent fluidized bed 3 with the pine powder, and heating the pine powder to carry out a high temperature hydro-rapid pyrolysis reaction, the pyrolysis product comprising the cracked oil and gas, heat carrier and semi-coke are carried upward with an ascending gas velocity of 8 m/s; in the high temperature hydro-rapid pyrolysis reaction, an addition of the pine powder causes that the temperature of the high temperature synthesis gas and fly ash is lowered by 50° C.;

2) subjecting the cracked oil and gas to a first catalytic cracking in the upper part of the carrying fluidized bed 4 (in the gaseous phase and in the presence of hydrogen, fly ash and semi-coke) under a temperature of 700° C., and pyrolyzing the tar in the cracked oil and gas to generate a high temperature fuel gas containing methane and ethane;

3) subjecting the catalytic cracking product containing hot fly ash, semi-coke and high temperature fuel gas obtained in step 2) to the multi-stage of gas-solid separation as follows:

subjecting the catalytic cracking reaction product to a first-level purified by a first-level gas-solid separator 5, the separated large particles (with a particle size being 0.1 mm or more) and semi-coke (being applied as a high temperature catalytic cracking catalyst of the third-level crude fuel gas obtained from the third-level purification, and a filter material for filtering and removing dust) enter the filter material layer of the moving bed high temperature filter 8 to filter the third-level crude fuel gas derived from the third-level purification; then the filtered filter material enters the ultra-fine ash separator 9 for performing separation of an ultra-fine ash (with a particle size no more than 0.005 mm), and the separated ultra-fine ash is discharged from the ultrafine silicon-potash fertilizer product outlet 13 to the outside as a silicon-potash fertilizer product, and the residue following a removal of the ultra-fine ash passes through a first-level return feeder 10 and is returned to the turbulent fluidized bed 3 for performing the combustion gasification reaction at a temperature of 850° C.;

the first-level crude fuel gas obtained from the first-level purification enters a second-level gas-solid separator 6 for performing the second-level purification, and the separated medium and small particle (with a particle size more than 0.02 mm) carrier and the semi-coke pass through a second-level return feeder 11 and are directly recycled to a lower part of the turbulent fluidized bed 3 to carry out the gasification and stable combustion reaction;

the second-level crude fuel gas obtained from the second-level purification enters a three-level gas-solid separator 7 for performing the third-level purification, and the separated fine particles (with a particle size more than 0.005 mm) are discharged from a silicon-potash fertilizer outlet 14 to the outside;

the third-level crude fuel gas obtained from the third-level purification enters the moving bed high temperature filter 8, and a small amount of tar in the third-level crude fuel gas is in synergy with the semi-coke at a temperature of 780° C. through the large particle high temperature carrier, so as to perform the second catalytic cracking to produce a product containing methane and ethane, in the meanwhile, the third-level crude fuel gas is filtered to remove the ultra-fine ash, and the purified fuel gas obtained is delivered from the purified fuel gas outlet 12 to the outside.

Wherein, the weight ratio of pine powder to fly ash is 1:8; the temperature of the high temperature hydro-rapid pyrolysis reaction is 800° C., the temperature of the second catalytic cracking reaction is 780° C., and the temperature of the combustion and gasification reaction is 850° C.

The calorific value of the purified fuel gas is 1,450 kcal/Nm$^3$, the tar content in the purified fuel gas is less than 1 mg/Nm$^3$, the dust content in purified fuel gas is less than 5 mg/Nm$^3$; and the silicon-potash fertilizer yield is about 10%.

Example 2

1) feeding cotton straw having an average particle diameter less than 5 mm into the lower-middle part of a carrying fluidized bed 4 in a circulating fluidized bed 16 via a biomass particle inlet 1, and adding dolomite to be replenished having an average particle diameter less than 5 mm from a heat carrier inlet 2 to a lower part of a turbulent fluidized bed 3 in the circulating fluidized bed 16;

mixing, in the carrying fluidized bed 4, the high temperature synthesis gas and dolomite having a temperature of 750° C. from the turbulent fluidized bed 3, and heating the cotton straw to carry out a high temperature hydro-rapid pyrolysis reaction, the pyrolysis product comprising the cracked oil and gas, heat carrier and semi-coke are carried upward with an ascending gas velocity of 6 m/s; in the high temperature hydro-rapid pyrolysis reaction, an addition of the cotton straw causes that the temperature of the high temperature synthesis gas and dolomite is lowered by 30° C.;

2) subjecting the cracked oil and gas to a first catalytic cracking in the upper-middle part of the carrying fluidized bed 4 (the gaseous phase and in the presence of hydrogen, dolomite and semi-coke) under a temperature of 710° C., and pyrolyzing the tar in the cracked oil and gas to generate a high temperature fuel gas containing methane and ethane;

3) subjecting the catalytic cracking product containing hot dolomite, semi-coke and high temperature fuel gas obtained in step 2) to the multi-stage of gas-solid separation as follows:

subjecting the catalytic cracking reaction product to a first-level purified by a first-level gas-solid separator 5, the separated large particles (with a particle size being 0.08 mm or more) and semi-coke (being applied as a high temperature catalytic cracking catalyst of the third-level crude fuel gas obtained from the third-level purification, and a filter material for filtering and removing dust) enter the filter material layer of the moving bed high temperature filter 8 to filter the third-level crude fuel gas derived from the third-level purification; then the filtered filter material enters the ultra-fine ash separator 9 for performing separation of an ultra-fine ash (with a particle size no more than 0.005 mm), and the separated ultra-fine ash is discharged from the ultrafine silicon-potash fertilizer product outlet 13 to the outside as a silicon-potash fertilizer product, and the residue following a removal of the ultra-fine ash passes through a first-level return feeder 10 and is returned to the turbulent fluidized bed 3 for performing the combustion gasification reaction at a temperature of 750° C.;

the first-level crude fuel gas obtained from the first-level purification enters a second-level gas-solid separator 6 for performing the second-level purification, and the separated medium and small particle (with a particle size more than 0.02 mm) carrier and the semi-coke pass through a second-level return feeder 11 and are directly recycled to a lower part of the turbulent fluidized bed 3 to carry out gasification and stable combustion reaction;

the second-level crude fuel gas obtained from the second-level purification enters a three-level gas-solid separator 7 for performing the third-level purification, and the separated fine particles are discharged from a silicon-potash fertilizer outlet 14 to the outside;

the third-level crude fuel gas obtained from the third-level purification enters the moving bed high temperature filter 8, and a small amount of tar in the third-level crude fuel gas is in synergy with the semi-coke at a temperature of 850° C. through the large particle high temperature carrier, so as to perform the second catalytic cracking to produce a product containing methane and ethane, in the meanwhile, the third-level crude fuel gas is filtered to remove the ultra-fine ash, and the purified fuel gas obtained is delivered from the purified fuel gas outlet 12 to the outside.

Wherein, the weight ratio of cotton straw to dolomite is 1:2; the temperature of the high temperature hydro-rapid pyrolysis reaction is 720° C., the temperature of the second catalytic cracking reaction is 710° C., and the temperature of the combustion and gasification reaction is 750° C.

The calorific value of the purified fuel gas is 1,500 kcal/Nm$^3$, the tar content in the purified fuel gas is less than 1.5 mg/Nm$^3$, the dust content in the purified fuel gas is less than 3 mg/Nm$^3$; and the silicon-potash fertilizer yield is about 10%.

Example 3

1) feeding corn stover having an average particle diameter less than 5 mm into the lower-middle part of a carrying fluidized bed 4 in a circulating fluidized bed 16 via a biomass particle inlet 1, and adding iron-based catalyst to be replenished having an average particle diameter less than 5 mm from a heat carrier inlet 2 to a lower part of a turbulent fluidized bed 3 in the circulating fluidized bed 16;

mixing, in the carrying fluidized bed 4, the high temperature synthesis gas having a temperature of 950° C. from the turbulent fluidized bed 3 with the iron-based catalyst, and heating the corn stover to carry out a high temperature hydro-rapid pyrolysis reaction, the pyrolysis product comprising the cracked oil and gas, heat carrier and semi-coke are carried upward with an ascending gas velocity of 16 m/s; in the high temperature hydro-rapid pyrolysis reaction, an addition of the corn stover causes that the temperature of the high temperature synthesis gas and iron-based catalyst is lowered by 100° C.;

2) subjecting the cracked oil and gas to a first catalytic cracking in the upper part of the carrying fluidized bed 4 (the gaseous phase and in the presence of hydrogen, iron-based catalyst and semi-coke) under a temperature of 840° C., and pyrolyzing the tar in the cracked oil and gas to generate a high temperature fuel gas containing methane and ethane;

3) subjecting the catalytic cracking product containing iron-based catalyst, semi-coke and high temperature fuel gas obtained in step 2) to the multi-stage of gas-solid separation as follows:

subjecting the catalytic cracking reaction product to a first-level purified by a first-level gas-solid separator 5, the separated large particles (with a particle size being 0.05 mm or more) and semi-coke (being applied as a high temperature catalytic cracking catalyst of the third-level crude fuel gas obtained from the third-level purification, and a filter material for filtering and removing dust) enter the filter material layer of the moving bed high temperature filter 8 to filter the third-level crude fuel gas derived from the third-level purification; then the filtered filter material enters the ultra-fine ash separator 9 for performing separation of an ultra-fine ash (with a particle size no more than 0.005 mm), and the separated ultra-fine ash is discharged from the ultrafine silicon-potash fertilizer product outlet 13 to the outside as a silicon-potash fertilizer product, and the residue following a removal of the ultra-fine ash passes through a first-level return feeder 10 and is returned to the turbulent fluidized bed 3 for performing the combustion gasification reaction at a temperature of 950° C.;

the first-level crude fuel gas obtained from the first-level purification enters a second-level gas-solid separator 6 for performing the second-level purification, and the separated medium and small particle (with a particle size more than 0.02 mm) carrier and the semi-coke pass through a second-level return feeder 11 and are directly recycled to a lower part of the turbulent fluidized bed 3 to carry out gasification and stable combustion reaction;

the second-level crude fuel gas obtained from the second-level purification enters a three-level gas-solid separator 7 for performing the third-level purification, and the separated fine particles are discharged from a silicon-potash fertilizer outlet 14 to the outside;

the third-level crude fuel gas obtained from the third-level purification enters the moving bed high temperature filter 8, and a small amount of tar in the third-level crude fuel gas is in synergy with the semi-coke at a temperature of 840° C. through the large particle high temperature carrier, so as to perform the second catalytic cracking to produce a product containing methane and ethane, in the meanwhile, the third-level crude fuel gas is filtered to remove the ultra-fine ash, and the purified fuel gas obtained is delivered from the purified fuel gas outlet 12 to the outside.

Wherein, the weight ratio of corn stover to iron-based catalyst is 1:6; the temperature of the high temperature hydro-rapid pyrolysis reaction is 850° C., the temperature of the second catalytic cracking reaction is 840° C., and the temperature of the combustion and gasification reaction is 950° C.

The calorific value of the purified fuel gas is 1,550 kcal/Nm$^3$, the tar content in the purified fuel gas is less than 0.3 mg/Nm$^3$, the dust content in the purified fuel gas is less than 2 mg/Nm$^3$; and the silicon-potash fertilizer yield is about 10%.

Comparative Example 1

The comparative example is used to describe a prior art for biomass pyrolysis gasification.

1) feeding pine powder having an average particle diameter less than 5 mm into the lower-middle part of a carrying fluidized bed in a circulating fluidized bed via a biomass particle inlet, and adding fly ash to be replenished having an average particle diameter less than 5 mm from a heat carrier inlet to a lower part of a turbulent fluidized bed in the circulating fluidized bed;

mixing the pine powder, in the carrying fluidized bed, with the high temperature synthesis gas and the high temperature fly ash having a temperature of 850° C. from the turbulent fluidized bed, and heating the mixture to carry out a high temperature hydro-rapid pyrolysis reaction, the obtained pyrolysis product comprising the cracked oil and gas, heat carrier and semi-coke are carried upward with an ascending gas velocity of 6 m/s; in the high temperature hydro-rapid pyrolysis reaction, an addition of the pine powder causes that the temperature of the high temperature synthesis gas and fly ash is lowered by 50° C.;

2) subjecting the cracked oil and gas to a first catalytic cracking in the upper-middle part of the carrying fluidized bed (the gaseous phase and in the presence of hydrogen, fly ash and semi-coke) under a temperature of 800° C., and pyrolyzing the tar in the cracked oil and gas to generate a high temperature fuel gas containing methane and ethane;

3) subjecting the catalytic cracking product containing hot fly ash, semi-coke and high temperature fuel gas obtained in step 2) to the three multi-stage of gas-solid separation as follows:

subjecting the catalytic cracking reaction product to a first-level purified by a first-level gas-solid separator, the separated large particles (with a particle size being 0.05 mm or more) and semi-coke passes through a first-level return feeder and is returned to the turbulent fluidized bed for performing the combustion gasification reaction at a temperature of 850° C.;

the first-level crude fuel gas obtained from the first-level purification enters a second-level gas-solid separator for performing the second-level purification, and the separated medium and small particle (with a particle size more than 0.02 mm) carrier and the semi-coke pass through a second-level return feeder 11 and are directly recycled to a lower part of the turbulent fluidized bed to carry out gasification and stable combustion reaction;

the second-level crude fuel gas obtained from the second-level purification enters a three-level gas-solid separator for performing the third-level purification, and the separated fine particles (with a particle size more than 0.005 mm) are discharged from a silicon-potash fertilizer outlet to the outside, and the separated the purified fuel gas is delivered from the purified fuel gas outlet to the outside;

wherein, the weight ratio of pine powder to fly ash is 1:8; the temperature condition of the high temperature hydro-rapid pyrolysis reaction is 800° C., and the temperature condition of the combustion and gasification reaction is 850° C.

The calorific value of the purified fuel gas is 1,350 kcal/Nm$^3$, the tar content in the purified fuel gas is less than 12 mg/Nm$^3$, the dust content in the purified fuel gas is less than 10 mg/Nm$^3$; and the silicon-potash fertilizer yield is about 10%.

As can be seen from the above-mentioned examples and comparative examples, the method of biomass grading pyrolysis gasificaiton in a circulating fluidized bed provided by the invention may be used for preparing the biomass into a cleaner fuel gas with high calorific value, and performing the cooperative production of fertilizer.

The above content describes in detail the preferred embodiments of the invention, but the invention is not limited thereto. A variety of simple modifications can be made to the technical solutions of the invention within the scope of the technical concept of the invention, including a combination of individual technical features in any other suitable manner, such simple modifications and combinations thereof should also be regarded as the content disclosed by the present invention, each of them falls into the protection scope of the present invention.

The invention claimed is:

1. A method of biomass grading pyrolysis gasification in a circulating fluidized bed comprising:
   1) feeding biomass particles having an average particle diameter less than 5 mm into a carrying fluidized bed in a circulating fluidized bed, the carrying fluidized bed having an upper part, a middle part, and a bottom part, and the biomass particles are fed into the carrying fluidized bed below the middle part and above the bottom part, and
   adding a heat carrier to be replenished having an average particle diameter less than 5 mm to a lower part of a turbulent fluidized bed in the circulating fluidized bed;
   mixing, in the carrying fluidized bed, a 750-950° C. high temperature synthesis gas and the heat carrier having a temperature of 750-950° C. from the turbulent fluidized bed with the biomass particles, and heating the biomass particles to carry out a 720-850° C. high temperature hydro-rapid pyrolysis reaction, and carrying pyrolysis product comprising cracked oil and gas, heat carrier and semi-coke upward;
   2) subjecting the cracked oil and gas to a first catalytic cracking in the upper part of the carrying fluidized bed, and pyrolyzing tar in the cracked oil and gas to generate a first catalytic cracking product having a temperature of 700-900° C. and comprising a fuel gas containing methane and ethane, wherein the first catalytic cracking is performed in the gaseous phase and in the presence of hydrogen, heat carrier and semi-coke, and the first catalytic cracking temperature is 700-900° C.;
   3) subjecting the catalytic cracking product obtained in step 2) to a multi-stage gas-solid separation:
   performing a first-level purification of the catalytic cracking product with a first-level gas-solid separator to separate out a first-level crude fuel gas, a large particle carrier, having a size larger than 0.05 mm, and semi-coke;
   introducing the first-level crude fuel gas into a second-level gas-solid separator for carrying out a second-level purification, in order to separate out a second-level crude fuel gas, a medium and small particle carrier, having a size larger than 0.02 mm and larger than 0.005 mm, respectively, and semi-coke;
   introducing the second-level crude fuel gas into a third-level gas-solid separator for performing a third-level purification, in order to separate out a third-level crude fuel gas and a fine particle material, having a size smaller than 0.005 mm;
   wherein the third-level crude fuel gas, the large particle carrier and the semi-coke from the first-level gas-solid separator enter into a moving bed high temperature filter, and tar in the third-level crude fuel gas contacts with the large particle carrier and the semi-coke at a temperature of 700-850° C. to carry out a second catalytic cracking so as to produce a product containing methane and ethane; and the large particle carrier and the semi-coke are applied as the filter material for filtering the third-level crude fuel gas to obtain a purified fuel gas product, comprising the product containing methane and ethane, the filtering removing ultra-fine ash, having a size smaller than 0.005 mm from the third-level crude fuel gas to produce separated ultra-fine ash, the separated ultra-fine ash is then discharged to the outside as a silicon-potash fertilizer product, and a residue, comprising the large particle carrier and semi-coke from the second-level gas-solid separator, remaining after removing the ultra-fine ash, is passed through a returner and is returned to the turbulent fluidized bed for performing a combustion and gasification reaction;
   the medium and small particle carrier and the semi-coke from the second-level gas-solid separator are directly recycled to the lower part of the turbulent fluidized bed for performing the combustion and gasification reaction.

2. The method according to claim 1, wherein the heat carrier is one or more of fly ash, dolomite, olivine, limestone, zeolite, alkaline earth metal catalyst, and iron-based catalyst.

3. The method according to claim 1, wherein the weight ratio of the biomass particles to the heat carrier is 1:2-8 in step 1).

4. The method according to claim 1, wherein the temperature of the high temperature synthesis gas and heat carrier is lowered by 25-100° C. after the high temperature hydro-rapid pyrolysis reaction in step 1).

5. The method according to claim 1, wherein the pyrolysis product has an ascending gas velocity of 3.5-18 m/s in the carrying fluidized bed in step 1).

6. The method according to claim 1, wherein the process of the combustion and gasification reaction comprises:
   the residue after a removal of the ultra-fine ash, the medium and small particle carrier and the semi-coke are reacted in the turbulent fluidized bed with an oxygen-containing gas and water vapor, so as to produce the high temperature synthesis gas and the heat carrier in the step 1); a temperature of the combustion and gasification reaction ranges from 750-950° C.

* * * * *